US012014670B2

(12) United States Patent
Bae

(10) Patent No.: US 12,014,670 B2
(45) Date of Patent: Jun. 18, 2024

(54) DISPLAY DEVICE AND METHOD OF DRIVING THE SAME

(71) Applicant: Samsung Display Co., Ltd., Yongin-si (KR)

(72) Inventor: Min-Seok Bae, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 10 days.

(21) Appl. No.: 17/879,391

(22) Filed: Aug. 2, 2022

(65) Prior Publication Data

US 2023/0196973 A1 Jun. 22, 2023

(30) Foreign Application Priority Data

Dec. 22, 2021 (KR) ........................ 10-2021-0184441

(51) Int. Cl.
*G09G 3/20* (2006.01)

(52) U.S. Cl.
CPC ... *G09G 3/2096* (2013.01); *G09G 2300/0426* (2013.01); *G09G 2300/0819* (2013.01); *G09G 2300/0828* (2013.01); *G09G 2300/0842* (2013.01); *G09G 2310/0275* (2013.01); *G09G 2310/0291* (2013.01); *G09G 2310/08* (2013.01)

(58) Field of Classification Search
CPC ......... G09G 3/2096; G09G 2300/0426; G09G 2300/0819; G09G 2300/0828; G09G 2300/0842; G09G 2310/0275; G09G 2310/0291; G09G 2310/08; G09G 2300/043; G09G 2300/0861; G09G 2320/0276; G09G 2320/0285; G09G 2320/0295; G09G 2320/043; G09G 3/3291; G09G 3/3233; G09G 5/001; G09G 5/003; G09G 2340/0435

See application file for complete search history.

(56) References Cited

U.S. PATENT DOCUMENTS

| | | | | |
|---|---|---|---|---|
| 10,360,827 | B2 * | 7/2019 | Bi | G09G 3/3233 |
| 2017/0270855 | A1 * | 9/2017 | Maeda | G09G 3/3233 |
| 2017/0372656 | A1 * | 12/2017 | Furukawa | G09G 3/3275 |
| 2018/0005579 | A1 * | 1/2018 | Brahma | G09G 3/3258 |

* cited by examiner

*Primary Examiner* — Andrew Sasinowski
(74) *Attorney, Agent, or Firm* — CANTOR COLBURN LLP

(57) ABSTRACT

A display device includes a display panel including pixels, a data driver configured to apply a data voltage to each of the pixels, to apply a first reference voltage to the pixels in a first period of a first sensing period to generate first sensing data corresponding to a first driving current flowing through a driving transistor of each of the pixels, and to apply a second reference voltage to the pixels in a second period of the first sensing period to generate second sensing data corresponding to a second driving current flowing through the driving transistor of each of the pixels, and a driving controller configured to receive the first sensing data and the second sensing data from the data driver to compensate input image data based on the first sensing data and the second sensing data.

18 Claims, 11 Drawing Sheets

DISPLAY DEVICE AND METHOD OF DRIVING THE SAME

This application claims priority to Korean Patent Application No. 10-2021-0184441, filed on Dec. 22, 2021, and all the benefits accruing therefrom under 35 U.S.C. § 119, the content of which in its entirety is herein incorporated by reference.

BACKGROUND

1. Field

Embodiments of the present invention relate to a display device and a method of driving a display device. More particularly, embodiments of the present invention relate to a display device and a method of driving a display device sensing a threshold voltage and a mobility of a driving transistor.

2. Description of the Related Art

Generally, a display device may include a display panel, a driving controller, gate driver, and a data driver. The display panel may include a plurality of gate lines, a plurality of data lines, and a plurality of pixels electrically connected to the gate lines and the data lines. The gate driver may provide gate signals to the gate lines. The data driver may provide data voltages to the data lines. The driving controller may control the gate driver and the data driver.

In the display device, differences in characteristics such as a threshold voltage and a mobility of a driving transistor may occur for each pixel due to process deviation, or the like. Accordingly, compensation of the data voltages applied to the pixels (i.e., compensation of input image data) may be performed to improve display quality.

Since a conventional display device requires a lot of time to sense the threshold voltage, the threshold voltage is sensed in a power-off state. However, in a case of the display device which power off for a short period of time, it is difficult to sense the threshold voltage in the power-off state.

SUMMARY

Embodiments of the present invention provide a display device for sensing a threshold voltage of a driving transistor of each of pixels by applying two voltages to the pixels.

Embodiments of the present invention also provide a method of driving the display device.

According to embodiments of the present invention, a display device includes a display panel including pixels, a data driver configured to apply a data voltage to each of the pixels, to apply a first reference voltage to the pixels in a first period of a first sensing period to generate first sensing data corresponding to a first driving current flowing through a driving transistor of each of the pixels, and to apply a second reference voltage to the pixels in a second period of the first sensing period to generate second sensing data corresponding to a second driving current flowing through the driving transistor of each of the pixels, and a driving controller configured to receive the first sensing data and the second sensing data from the data driver to compensate input image data based on the first sensing data and the second sensing data.

In an embodiment, the driving controller may be configured to calculate a threshold voltage value of the driving transistor of each of the pixels based on the first sensing data and the second sensing data, and to compensate the input image data based on the threshold voltage value.

In an embodiment, the threshold voltage value may be calculated by using an equation $$VTH = \frac{VGS2 \times \sqrt[2]{ID1} - VGD1 \times \sqrt[2]{ID2}}{\sqrt[2]{ID1} - \sqrt[2]{ID2}},$$

where VTH may be the threshold voltage value, VGS1 may be a gate-source voltage value of the driving transistor in the first period, VGS2 may be a gate-source voltage value of the driving transistor in the second period, ID1 may be a value of the first driving current, and ID2 may be a value of the second driving current.

In an embodiment, the data driver may be configured to generate the first sensing data and the second sensing data in one frame.

In an embodiment, the data driver may be configured to generate the first sensing data in a first frame and to generate the second sensing data in a second frame different from the first frame.

In an embodiment, the data driver may be configured to apply a third reference voltage to the pixels in a second sensing period to generate third sensing data corresponding to a third driving current flowing through the driving transistor of each of the pixels, and the driving controller may be configured to receive the third sensing data from the data driver, to calculate a mobility value of the driving transistor of each of the pixels, and to compensate the input image data based on the mobility value and the threshold voltage value.

In an embodiment, generating of the first sensing data, the second sensing data, and the third sensing data may be performed in a power-on state.

In an embodiment, the driving controller may be configured to compensate the third reference voltage based on the first sensing data and the second sensing data.

In an embodiment, the data driver may include an output buffer circuit configured to apply the data voltage to each of the pixels, and a sensing circuit configured to generate the first sensing data, the second sensing data, and the third sensing data.

In an embodiment, the sensing circuit may include an integrator connected to the pixels through a sensing line and configured to receive a driving current flowing through the driving transistor of each of the pixels through the sensing line, where the driving current may include the first driving current, the second driving current, and the third driving current.

In an embodiment, the integrator may be configured to fix an anode voltage of a light emitting element of each of the pixels to an active voltage in the first sensing period.

In an embodiment, the integrator may operate in the first sensing period and does not operate in the second sensing period.

In an embodiment, the sensing circuit may further include an analog-to-digital converter configured to generate the first sensing data, the second sensing data, and the third sensing data, a first switch configured to selectively connect the sensing line and the integrator, a second switch configured to selectively connect the integrator and the analog-to-digital converter, and a third switch configured to selectively connect the sensing line and the analog-to-digital converter.

In an embodiment, in the first sensing period, the first switch and the second switch may be turned on and the third switch may be turned off, and in the second sensing period, the first switch and the second switch may be turned off, and the third switch may be turned on.

In an embodiment, the sensing circuit may further include a fourth switch configured to selectively apply an initialization voltage to the sensing line.

In an embodiment, the sensing circuit may further include a fifth switch configured to selectively connect an input terminal of the integrator and an output terminal of the integrator.

In an embodiment, each of the pixels may include light emitting element, a first switching transistor configured to apply the data voltage to a control electrode of the driving transistor in response to a first gate signal, a storage capacitor configured to store the data voltage, a driving transistor configured to apply a driving current to the light emitting element based on the data voltage, a second switching transistor configured to provide the driving current to a sensing line in response to a second gate signal, and a third switching transistor configured to apply a first power voltage to the driving transistor in response to an emission signal, where the driving current may include the first driving current, the second driving current, and the third driving current.

In an embodiment, in the first period, the second period, and the second sensing period, the third switching transistor may be turned on after the first switching transistor may be turned on.

According to embodiments of the present invention, a method of driving a display device includes: generating first sensing data corresponding to a first driving current flowing through a driving transistor of each of pixels by applying a first reference voltage to the pixels in a first period of a first sensing period, generating second sensing data corresponding to a second driving current flowing through the driving transistor of each of the pixels by applying a second reference voltage to the pixels in a second period of the first sensing period, compensating a voltage value of a third reference voltage based on the first sensing data and the second sensing data, generating third sensing data corresponding to a third driving current flowing through the driving transistor of each of the pixels by applying the compensated third reference voltage to the pixels in a second sensing period, and compensating input image data based on the first sensing data, the second sensing data, and the third sensing data.

In an embodiment, the method may further include calculating a threshold voltage value of the driving transistor of each of the pixels based on the first sensing data and the second sensing data, and calculating a mobility value of the driving transistor of each of the pixels based on the third sensing data, and the compensating of the input image data may be performed based on the threshold voltage value and the mobility value.

Therefore, the display device and the method of driving the display device may effectively improve display quality by sensing a threshold voltage and a mobility.

In addition, the display device and the method of driving the display device may sense a threshold voltage in a power-on state by sensing the threshold voltage using an integrator.

Further, the display device and the method of driving the display device may reflect a gate-source voltage difference of a driving transistor in a sensing period and a display period by sensing a mobility using a passive manner.

However, the effects of the present invention are not limited to the above-described effects, and may be variously expanded without departing from the spirit and scope of the present invention.

DETAILED DESCRIPTION

It will be understood that, although the terms “first,” “second,” “third” etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, “a first element,” “component,” “region,” “layer” or “section” discussed below could be termed a second element, component, region, layer or section without departing from the teachings herein.

The terminology used herein is for the purpose of describing particular embodiments only and is not intended to be limiting. As used herein, “a”, “an,” “the,” and “at least one” do not denote a limitation of quantity, and are intended to include both the singular and plural, unless the context clearly indicates otherwise. For example, “an element” has the same meaning as “at least one element,” unless the context clearly indicates otherwise. “At least one” is not to be construed as limiting “a” or “an.” “Or” means “and/or.” As used herein, the term “and/or” includes any and all combinations of one or more of the associated listed items. It will be further understood that the terms “comprises” and/or “comprising,” or “includes” and/or “including” when used in this specification, specify the presence of stated features, regions, integers, steps, operations, elements, and/or components, but do not preclude the presence or addition of one or more other features, regions, integers, steps, operations, elements, components, and/or groups thereof.

Hereinafter, the present invention will be explained in detail with reference to the accompanying drawings.

Figure 1:
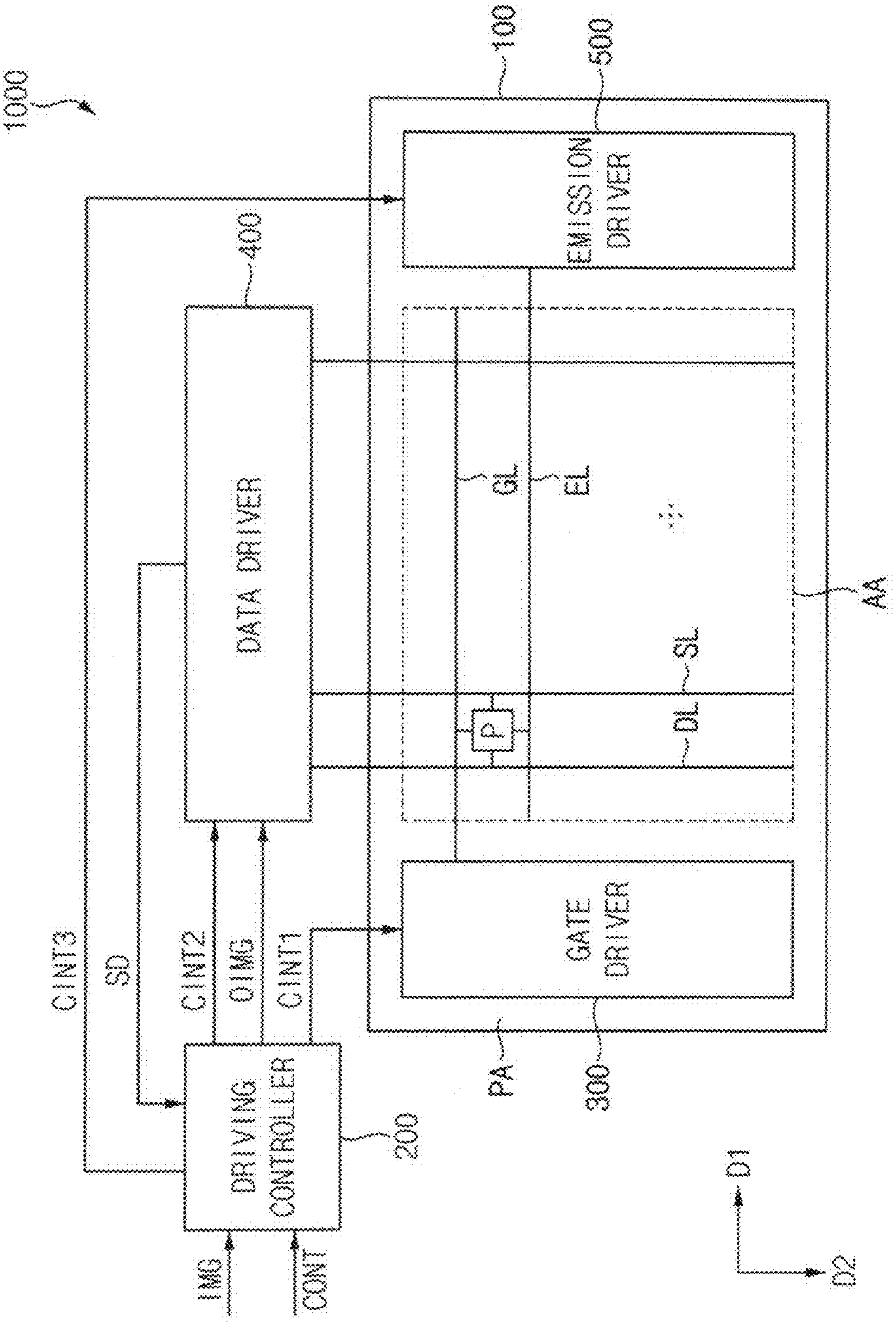
FIG. 1 is a diagram illustrating a display device according to embodiments of the present invention.

FIG. 1 is a diagram illustrating a display device 1000 according to embodiments of the present invention.

Referring to FIG. 1, the display device 1000 may include a display panel 100, a driving controller 200, a gate driver 300, a data driver 400, and a emission driver 500. In an embodiment, the driving controller 200 and the data driver 400 may be integrated into one chip.

The display panel 100 has a display region AA on which an image is displayed and a peripheral region PA adjacent to the display region AA. In an embodiment, the gate driver 300 and the emission driver 500 may be mounted on the peripheral region PA of the display panel 100.

The display panel 100 may include a plurality of gate lines GL, a plurality of data lines DL, a plurality of emission lines EL and a plurality of pixels P electrically connected to the data lines DL, the gate lines GL, and the emission lines EL. The gate lines GL and the emission lines EL may extend in a first direction D1 and the data lines DL may extend in a second direction D2 crossing the first direction Dl.

The driving controller 200 may receive input image data IMG and an input control signal CONT from a host processor (e.g., a graphic processing unit; GPU). For example, the input image data IMG may include red image data, green image data and blue image data. In an embodiment, the input image data IMG may further include white image data. For another example, the input image data IMG may include magenta image data, yellow image data, and cyan image data. The input control signal CONT may include a master clock signal and a data enable signal. The input control signal CONT may further include a vertical synchronizing signal and a horizontal synchronizing signal.

The driving controller 200 may generate a first control signal CONT1, a second control signal CONT2, and output image data OIMG based on the input image data IMG, sensing data SD, and the input control signal CONT.

The driving controller 200 may generate the first control signal CONT1 for controlling operation of the gate driver 300 based on the input control signal CONT and output the first control signal CONT1 to the gate driver 300. The first control signal CONT1 may include a vertical start signal and a gate clock signal.

The driving controller 200 may generate the second control signal CONT2 for controlling operation of the data driver 400 based on the input control signal CONT and output the second control signal CONT2 to the data driver 400. The second control signal CONT2 may include a horizontal start signal and a load signal.

The driving controller 200 may receive the input image data IMG, the sensing data SD, and the input control signal CONT, and generate the output image data OIMG. The driving controller 200 may receive the sensing data SD to compensate the input image data IMG. The driving controller 200 may output the output image data OIMG to the data driver 400.

The driving controller 200 may generate the third control signal CONT3 for controlling operation of the emission driver 500 based on the input control signal CONT and output the third control signal CONT3 to the emission driver 500.

The gate driver 300 may generate gate signals for driving the gate lines GL in response to the first control signal CONT1 input from the driving controller 200. The gate driver 300 may output the gate signals to the gate lines GL. For example, the gate driver 300 may sequentially output the gate signals to the gate lines GL.

The data driver 400 may receive the second control signal CONT2 and the output image data OIMG from the driving controller 200. The data driver 400 may convert the output image data OIMG into data voltages having an analog type. The data driver 400 may output the data voltage to the data lines DL. In an embodiment, the data driver 400 may output the data voltage in a display period. In an embodiment, the data driver 400 may generate the sensing data SD corresponding to a driving current flowing through a driving transistor DT of each of the pixels P. A detailed description thereof will be given later.

The emission driver 500 may generate emission signals for driving the emission lines EL in response to the third control signal CONT3 input from the driving controller 200. The emission driver 500 may output the emission signals to the emission lines EL. For example, the emission driver 500 may sequentially output the emission signals to the emission lines EL.

Figure 2:
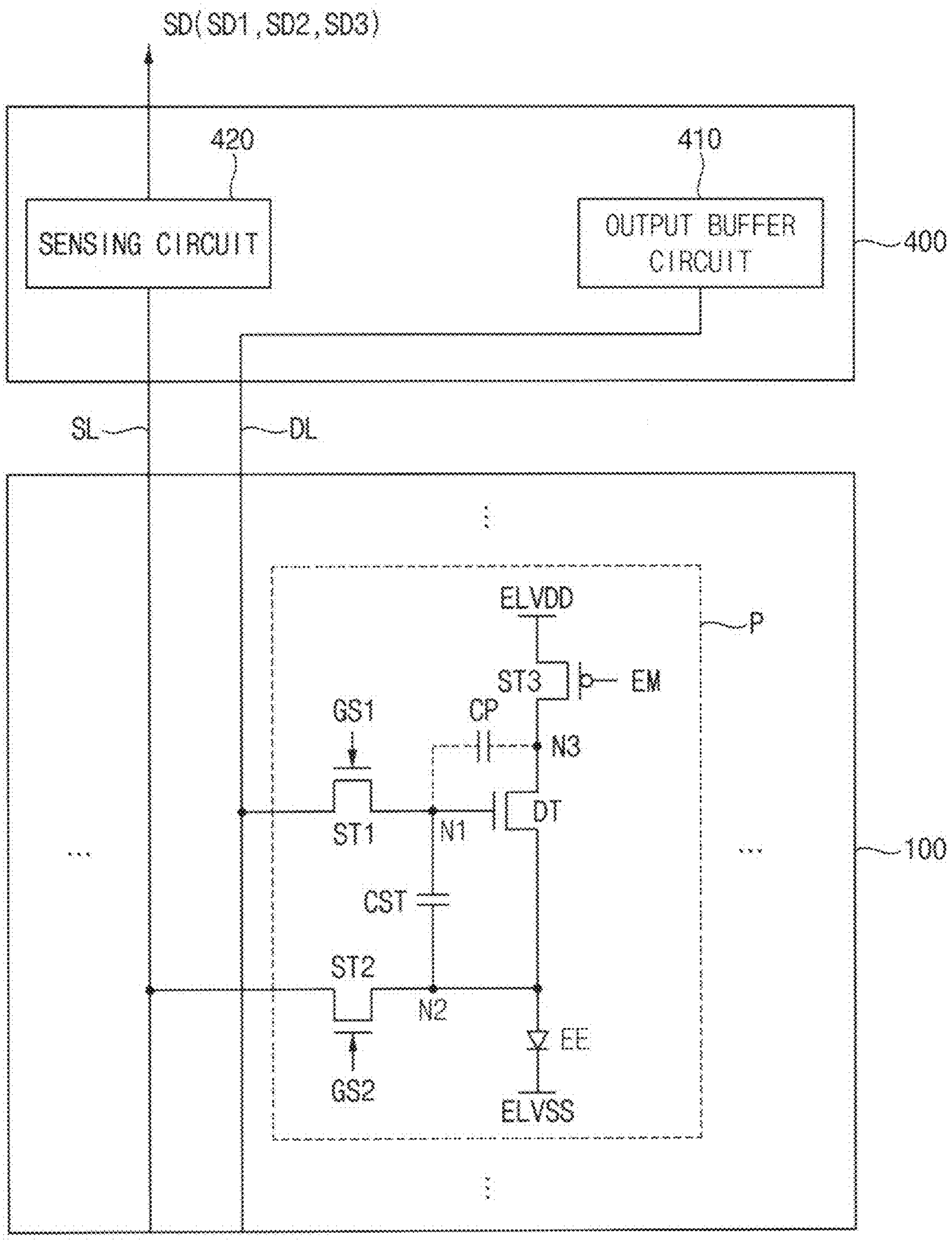
FIG. 2 is a block diagram illustrating an example of a display panel and a data driver of the display device of FIG. 1.
Figure 3:
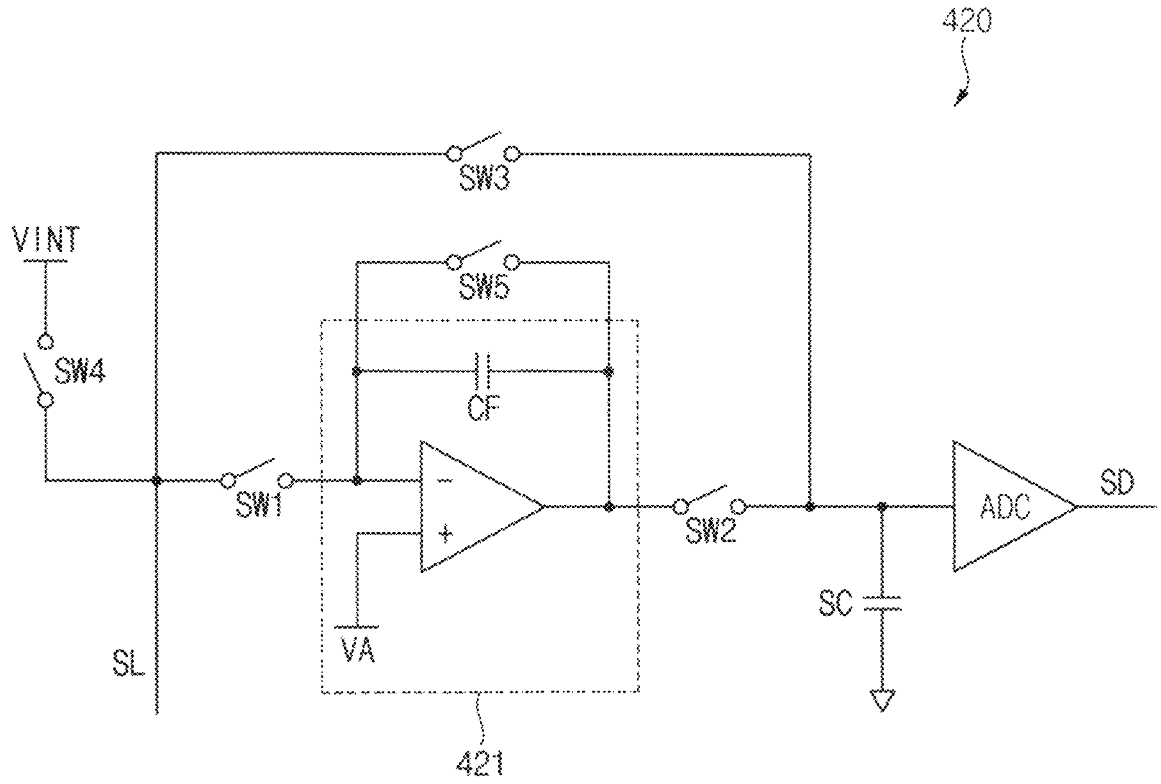
FIG. 3 is a circuit diagram illustrating an example of a sensing circuit included in a data driver of the display device of FIG. 1.

FIG. 2 is a block diagram illustrating an example of the display panel 100 and the data driver 400 of the display device 1000 of FIG. 1, and FIG. 3 is a circuit diagram illustrating an example of a sensing circuit 420 included in the data driver 400 of the display device 1000 of FIG. 1.

Referring to FIGS. 2 and 3, each of the pixels P may include a light emitting element EE, a first switching transistor ST1 for applying the data voltage to a control electrode of the driving transistor DT in response to a first gate signal GS1, a storage capacitor CST for storing the data voltage, the driving transistor for applying a driving current to the light emitting element EE based on the data voltage, a second switching transistor ST2 for flowing the driving current to the sensing line SL in response to a second gate signal GS2, and a third switching transistor ST3 for applying a first power voltage ELVDD to the driving transistor DT in response to the emission signal EM. In an embodiment, the first switching transistor ST1 and the second switching transistor ST2 may be an n-type transistor, and the third switching transistor ST3 may be a p-type transistor.

In an embodiment, for example, the first switching transistor ST1 may include a control electrode for receiving the first gate signal GS1, an input electrode connected to the data line DL, and an output electrode connected to a first node N1. The storage capacitor CST may include a first electrode connected to the first node N1 and a second electrode connected to a second node N2. The driving transistor DT may include the control electrode connected to the first node N1, an input electrode connected to the third node N3, and an output electrode connected to the second node N2. The second switching transistor ST2 may include a control electrode for receiving the second gate signal GS2, an input electrode connected to the second node N2, and an output electrode connected to the sensing line SL. The third switching transistor ST3 may include a control electrode for receiving the emission signal EM, an input electrode for receiving the first power voltage ELVDD, and an output electrode connected to the third node N3. The light emitting element EE may include an anode electrode connected to the second node N2 and a cathode electrode for receiving a second power voltage ELVSS. Each of the pixels P may include a parasitic capacitor CP between the first node N1 and the second node N3.

An output buffer circuit 410 may apply the data voltage to each of the pixels P. In an embodiment, the output buffer circuit 410 may sequentially apply the data voltage to the pixels P through the data lines DL in an active period, and apply a reference voltage for a sensing operation to the pixels through the data lines DL in the vertical blank period.

In an embodiment, the output buffer circuit 410 may provide the reference voltage (e.g., a first reference voltage, a second reference voltage, and a third reference voltage) for the sensing operation per one pixel row selected through the data lines DL in the vertical blank period.

The sensing circuit 420 may generate the sensing data SD. The sensing circuit 420 may generate a first sensing data SD1, a second sensing data SD2, and a third sensing data SD3. The sensing circuit 420 may receive the driving current of the driving transistor DT of each of the pixels P from the pixels P through the sensing lines SL, and generate the sensing data SD corresponding to the driving current value (i.e., the sensing operation).

The sensing circuit 420 may be connected to the pixels P through the sensing line SL, and include an integrator 421 for receiving the driving current of the driving transistor DT of each of the pixels P through the sensing line SL. In an embodiment, a one input terminal of the integrator 421 (e.g., a positive terminal of the integrator 421 of FIG. 3) may be set to constantly receive an active voltage VA. In an embodiment, the integrator 421 may operate in a first sensing period and may not operate in a second sensing period. A detailed description thereof will be given later.

In an embodiment, the sensing circuit 420 may include an analog-to-digital converter ADC for generating the first sensing data SD1, the second sensing data SD2, and the third sensing data SD3, a first switch SW1 for selectively connecting the sensing line SL and the integrator 421, a second switch SW2 for selectively connecting the integrator 421 and the analog-to-digital converter ADC, and a third switch SW3 for selectively connecting the sensing line SL and the analog-to-digital converter ADC. In an embodiment, the sensing circuit 420 may further include a fourth switch SW4 for selectively applying an initialization voltage VINT to the sensing line SL. In an embodiment, the sensing circuit 420 may further include a fifth switch SW5 for selectively connecting the input terminal of the integrator 421 and an output terminal of the integrator 421.

Figure 4:
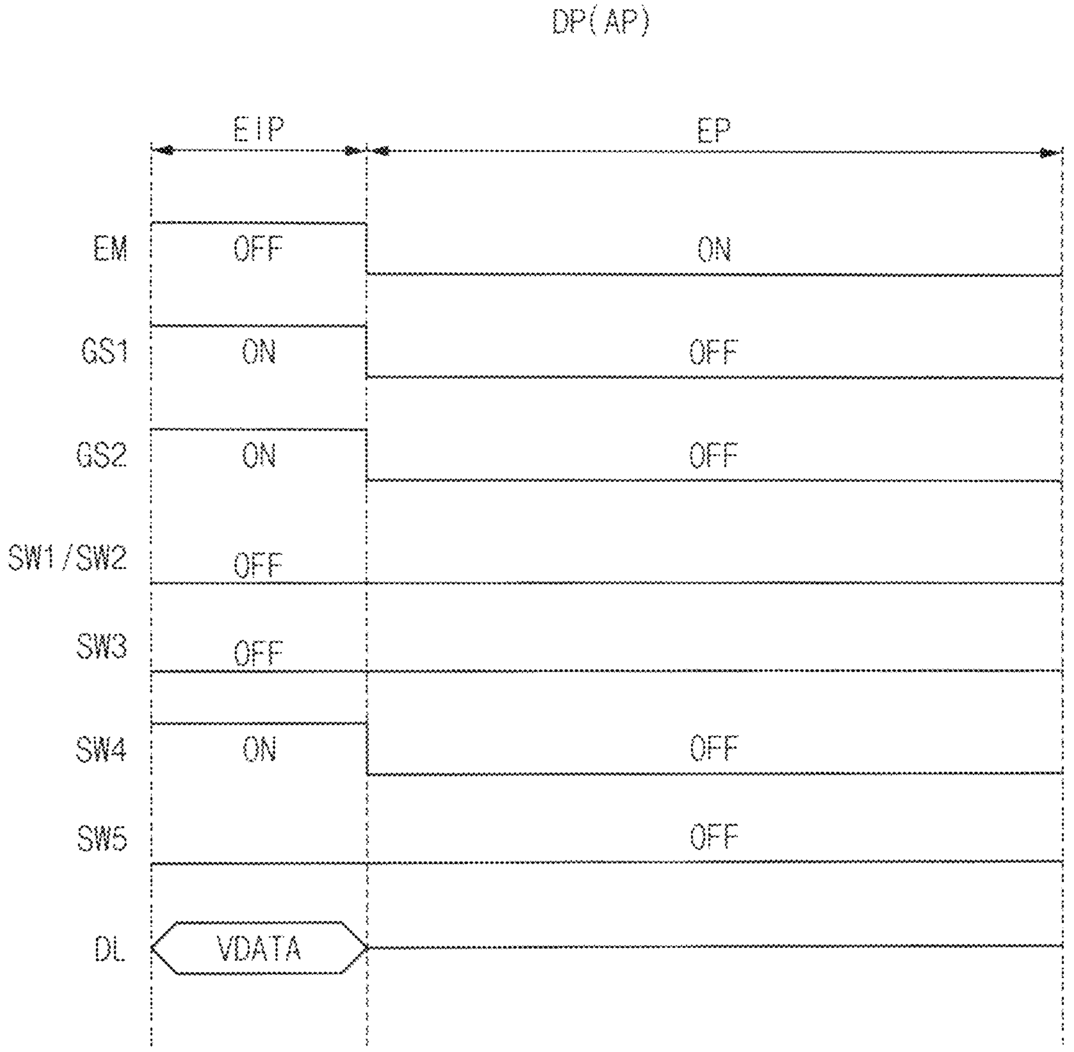
FIG. 4 is a timing diagram illustrating an example in which the display device of FIG. 1 operates in a display period.

FIG. 4 is a timing diagram illustrating an example in which the display device 1000 of FIG. 1 operates in the display period DP. In FIG. 4, it is assumed that the first switching transistor ST1 and the second switching transistor ST2 are n-type transistors, and the third switching transistor ST3 is a p-type transistor.

Referring to FIGS. 1 to 4, the data driver 400 may apply the data voltage VDATA to the pixels P through the data line DL in the display period DP. The display period DP may correspond to the active period AP of each frame. The display device 1000 may display an image corresponding to the input image data IMG on the display panel 100 in the display period DP.

In an emission initialization period EIP of the display period DP, the emission signal EM may have an inactive level, the first gate signal GS1 and the second gate signal GS2 may have an activation level, and the first switch SW1, the second switch SW2, and the third switch SW3 may be turned off, the fourth switch SW4 may be turned on, the fifth switch SW5 may be turned off, and the data voltage VDATA may be applied to the data line DL. For example, in the light emission initialization period EIP of the display period DP, the data voltage VDATA may be applied to the control electrode (i.e., the first node N1) of the driving transistor DT, and the initialization voltage VINT may be applied to the anode electrode (i.e., the second node N2) of the light emitting element EE. Accordingly, a gate-source voltage (i.e., a voltage between the control electrode and the output electrode of the driving transistor DT) of the driving transistor DT may have a value corresponding to a difference between the data voltage VDATA and the initialization voltage VINT, and the storage capacitor CST may store the gate-source voltage corresponding to the difference between the data voltage VDATA and the initialization voltage VINT.

In the emission period EP of the display period DP, the emission signal EM may have an activation level, the first gate signal GS1 and the second gate signal GS2 may have an inactivation level, and the first switch SW1, the second switch SW2, the third switch SW3, the fourth switch SW4, and the fifth switch SW5 may be turned off. For example, in the emission period EP of the display period DP, the first power voltage ELVDD may be applied to the input electrode of the driving transistor DT, and the driving current corresponding to the gate-source voltage (i.e., a voltage between the control electrode and the output electrode of the driving transistor DT) of the driving transistor DT may be generated. Also, since the first switching transistor ST1 is turned off, the first node N1 may be in a floating state. However, due to an influence of the parasitic capacitor CP, a voltage of the first node N1 may not increase by an increase width of the anode voltage of the anode electrode (i.e., the second node N2) of the light emitting element EE. For example, when the anode voltage increases by ΔV with a flow of the driving current in the emission period EP, the gate-source voltage (i.e., a voltage between the control electrode and the output electrode of the driving transistor DT) of the driving transistor DT in the emission period EP may be decreased by $$\frac{CP}{CST+CP}\times\Delta V,$$

where CP may be a capacitance of the parasitic capacitor and CST may be a capacitance of the storage capacitor, than the gate-source voltage (i.e., a voltage between the control electrode and the output electrode of the driving transistor DT) of the driving transistor DT in the emission initialization period EIP.

Figure 5:
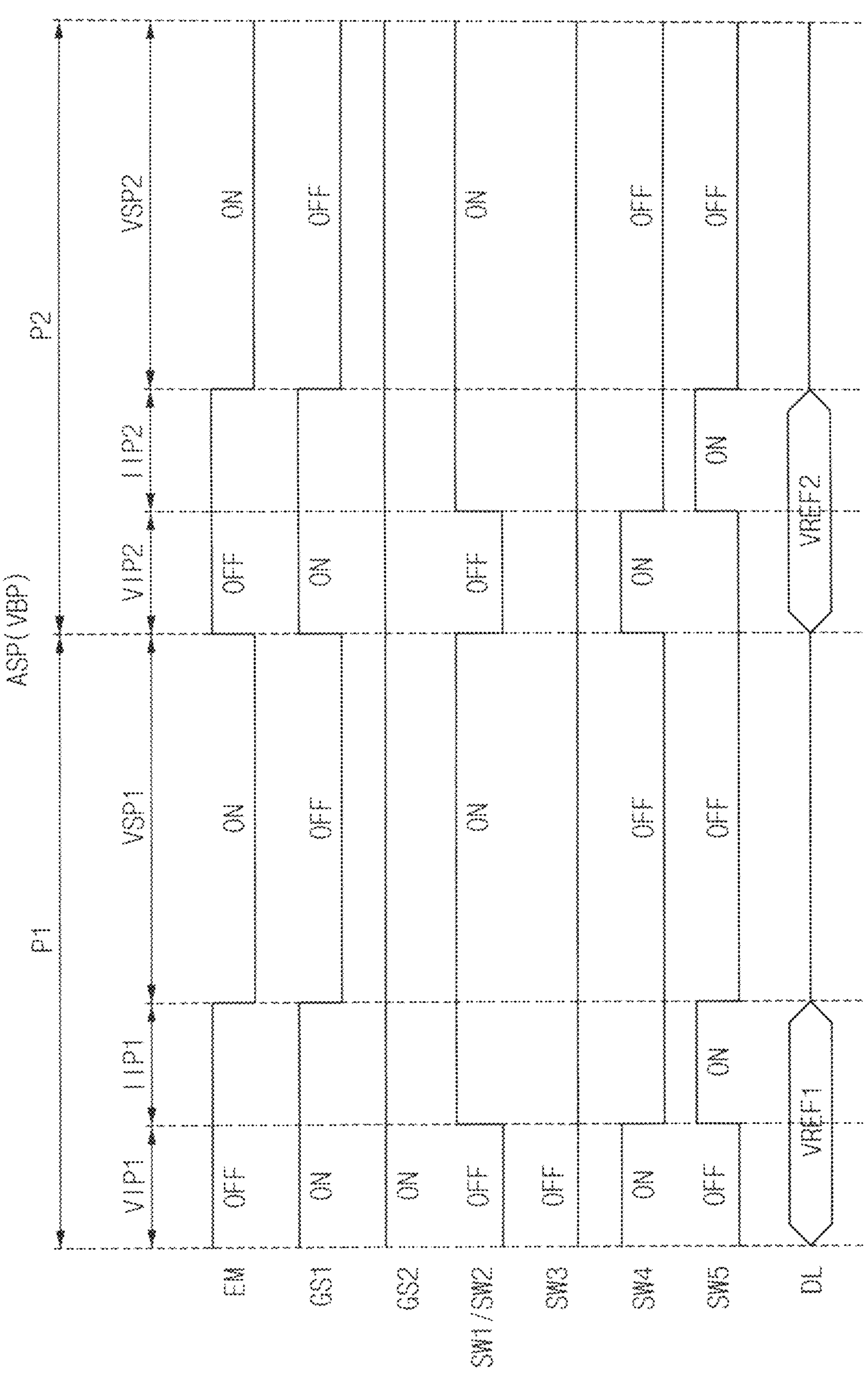
FIG. 5 is a timing diagram illustrating an example in which the display device of FIG. 1 operates in a first sensing period.
Figure 6:
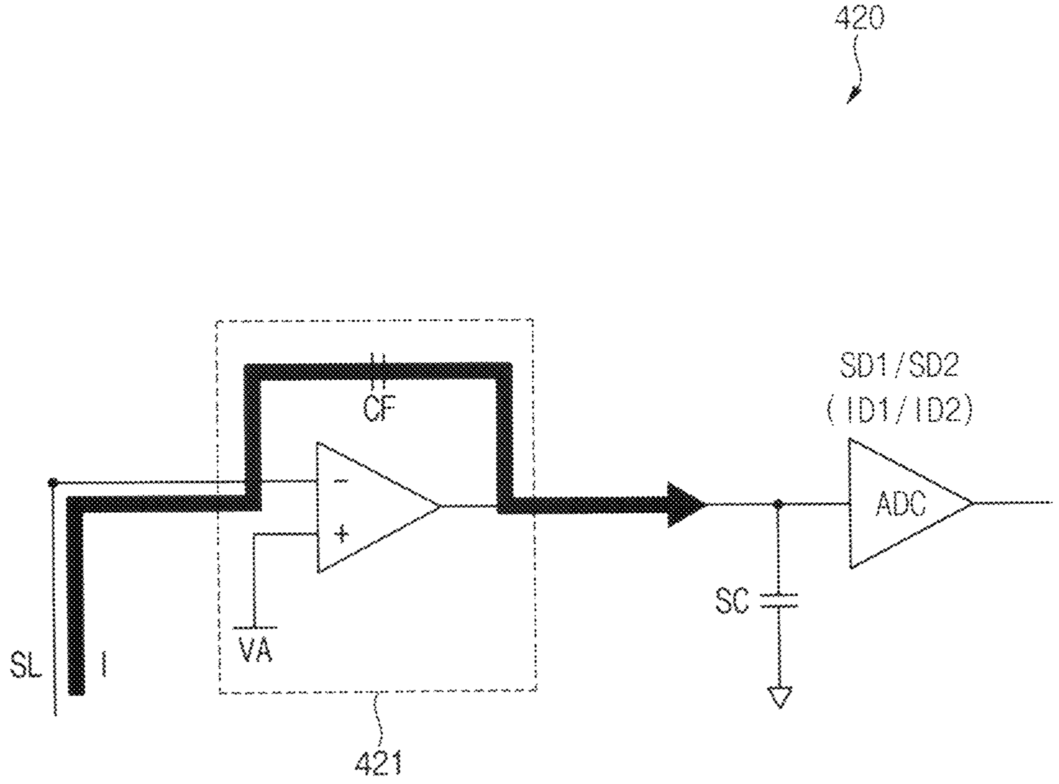
FIG. 6 is a circuit diagram illustrating an example of a flow of a driving current of the display device of FIG. 1 in a first sensing period.

FIG. 5 is a timing diagram illustrating an example in which the display device 1000 of FIG. 1 operates in a first sensing period ASP, and FIG. 6 is a circuit diagram illustrating an example of a flow of the driving current of the display device 1000 of FIG. 1 in the first sensing period ASP. In FIG. 5, it is assumed that the first switching transistor ST1 and the second switching transistor ST2 are n-type transistors, and the third switching transistor ST3 is a p-type transistor.

FIGS. 1 to 3, 5 and 6, the data driver 400 may apply a first reference voltage VREF1 to the pixels P in the first period P1 of the first sensing period ASP, and generate the first sensing data SD1 corresponding to a first driving current value ID1 (See the equation 1 below) of the driving transistor DT of each of the pixels P. The data driver 400 may apply a second reference voltage VREF2 to the pixels P in the second period P2 of the first sensing period ASP, and generate the second sensing data SD2 corresponding to a second driving current value ID2 (See the equation 1 below) of the driving transistor DT of each of the pixels P. The driving controller 200 may receive the first sensing data SD1 and the second sensing data SD2 from the data driver 400 to compensate the input image data IMG. In an embodiment, the driving controller 200 may calculate a threshold voltage value of the driving transistor DT of each of the pixels P based on the first sensing data SD1 and the second sensing data SD2, and compensate the input image data IMG based on the threshold voltage value. That is, the display device 1000 may sense the threshold voltage of the driving transistor DT of each of the pixels P based on the first sensing data SD1 and the second sensing data SD2. Generating of the first sensing data SD1 and the second sensing data SD2 may be performed in a power-on state. The power-on state may mean a state in which a power of the display device 1000 is turned on.

The data driver 400 may apply the first reference voltage VREF1 and the second reference voltage VREF2 to the pixels P through the data line DL in the first sensing period ASP. In an embodiment, the data driver 400 may generate the first sensing data SD1 and the second sensing data SD2 in one frame. That is, the first period P1 and the second section P2 of the first sensing period ASP may be included in one vertical blank period VBP. The vertical blank period VBP may include the first sensing period ASP and a second sensing period PSP to be described later. In an embodiment, in the vertical blank period VBP, the first sensing period ASP and the second sensing period PSP may be alternately repeated. For example, when the vertical blank period VBP of a current frame is the first sensing period ASP, the vertical blank period VBP of a next frame may be the second sensing period PSP.

The integrator 421 may operate in the first sensing period ASP. For example, in the first sensing period ASP, the first switch SW1 and the second switch SW2 may be turned on and the third switch SW3 may be turned off.

The first sensing period ASP may include the first period P1 generating the first sensing data SD1 and the second period P2 generating the second sensing data SD2, the first period P1 may include a first threshold voltage initialization period VIP1, a first integral initialization period IIP1, and a first threshold voltage sensing period VSP1, and the second period P2 may include a second threshold voltage initialization period VSP2, a second integral initialization period IIP2, and a second threshold voltage sensing period VSP2. After the first switching transistor ST1 is turned on in the first period P1 and the second period P2, the third switching transistor ST3 may be turned on. In addition, as the first switching transistor ST1 is turned off in the first period P1 and the second period P2, the third switching transistor ST3 may be turned on. Accordingly, in the first sensing period ASP, the control electrode (i.e., the first node N1) of the driving transistor DT may be in a floating state.

In an embodiment, for example, in the first threshold voltage initialization period VIP1, the emission signal EM may have an inactivation level, the first gate signal GS1 and the second gate signal GS2 may have an activation level, and the first switch SW1, the second switch SW2, and the third switch SW3 may be turned off, the fourth switch SW4 may be turned on, the fifth switch SW5 may be turned off, and the first reference voltage VREF1 may be applied to the data line DL. For example, in the first threshold voltage initialization period VIP1, the first reference voltage VREF1 may be applied to the control electrode (i.e., the first node N1) of the driving transistor DT, and the initialization voltage VINT may be applied to the anode electrode (i.e., the second node N2) of the light emitting element EE.

In an embodiment, for example, in the first integral initialization period IIP1, the emission signal EM may have a inactivation level, the first gate signal GS1 may have an activation level, and the second gate signal GS2 may have an activation level, the first switch SW1 and the second switch SW2 may be turned on, the third switch SW3 may be turned off, the fourth switch SW4 may be turned off, the fifth switch SW5 may be turned on, and the first reference voltage VREF1 may be applied to the data line DL. As the fifth switch SW5 is turned on in the first integral initialization period IIP1, the integrator 421 may be initialized. For example, as the fifth switch SW5 is turned on, a voltage stored in an integration capacitor CF of the integrator 421 may be initialized. Also, the integrator 421 may fix the anode voltage of the light emitting element EE (i.e., the voltage of the second node N2) to the active voltage VA. For example, the active voltage VA may be applied to a positive terminal of the integrator 421, and the anode voltage (i.e., the voltage of the second node N2) of the light emitting element EE may be fixed as the active voltage VA when the negative terminal of the integrator 421 is connected to the anode electrode (i.e., the second node N2) of the light emitting element EE through the sensing line SL.

In an embodiment, for example, in the first threshold voltage sensing period VSP1, the emission signal EM may have an activation level, the first gate signal GS1 may have an inactivation level, the second gate signal GS2 may have an activation level, the first switch SW1 and the second switch SW2 may be turned on, the third switch SW3 may be turned off, the fourth switch SW4 may be turned off, and the fifth switch SW5 may be turned off. For example, in the first threshold voltage sensing period VSP1, the first power voltage ELVDD may be applied to the input electrode of the driving transistor DT, and the driving current I corresponding to the gate-source voltage (i.e., a voltage between the control electrode and the output electrode of the driving transistor DT) of the driving transistor DT may be generated.

The driving current I may be applied to the analog-to-digital converter ADC through the sensing line SL and the integrator 421. The analog-to-digital converter ADC may generate the first sensing data SD1 corresponding to the first driving current value ID1 (i.e., a current value of the driving current I in the first threshold voltage sensing period VSP1). Also, since the first switching transistor ST1 is turned off, the first node N1 may be in the floating state. However, since the anode voltage of the light emitting element EE is fixed to the active voltage VA, an increment of the anode voltage generated by the driving current I may not occur. That is, a decrement of the gate-source voltage (i.e., a voltage between the control electrode and the output electrode of the driving transistor DT) of the driving transistor DT generated by the increment of the anode voltage in the display period DP of FIG. 4 may not occur.

In an embodiment, for example, in the second threshold voltage initialization period VIP2, the emission signal EM may have an inactive level, the first gate signal GS1 and the second gate signal GS2 may have an active level, and the first switch SW1, the second switch SW2, and the third switch SW3 may be turned off, the fourth switch SW4 may be turned on, the fifth switch SW5 may be turned off, and the second reference voltage VREF2 may be applied to the data line DL. For example, in the second threshold voltage initialization period VIP2, the second reference voltage VREF2 may be applied to the control electrode (i.e., the first node N1) of the driving transistor DT, and the initialization voltage VINT may be applied to the anode electrode (i.e., the second node N2) of the light emitting element EE.

In an embodiment, for example, in the second integral initialization period IIP2, the emission signal EM may have a inactivation level, the first gate signal GS1 may have an activation level, and the second gate signal GS2 may have an activation level, the first switch SW1 and the second switch SW2 may be turned on, the third switch SW3 may be turned off, the fourth switch SW4 may be turned off, and the fifth switch SW5 may be turned on, and the second reference voltage VREF2 may be applied to the data line DL. As the fifth switch SW5 is turned on in the first integral initialization period IIP1, the integrator 421 may be initialized. For example, as the fifth switch SW5 is turned on, a voltage stored in an integration capacitor CF of the integrator 421 may be initialized. Also, the integrator 421 may fix the anode voltage of the light emitting element EE (i.e., the voltage of the second node N2) to the active voltage VA. For example, the active voltage VA may be applied to a positive terminal of the integrator 421, and the anode voltage (i.e., the voltage of the second node N2) of the light emitting element EE may be fixed as the active voltage VA when the negative terminal of the integrator 421 is connected to the anode electrode (i.e., the second node N2) of the light emitting element EE through the sensing line SL.

In an embodiment, for example, in the second threshold voltage sensing period VSP2, the emission signal EM may have an activation level, the first gate signal GS1 may have an inactivation level, the second gate signal GS2 may have an activation level, the first switch SW1 and the second switch SW2 may be turned on, the third switch SW3 may be turned off, the fourth switch SW4 may be turned off, and the fifth switch SW5 may be turned off. For example, in the second threshold voltage sensing period VSP2, the first power voltage ELVDD may be applied to the input electrode of the driving transistor DT, and the driving current I corresponding to the gate-source voltage (i.e., a voltage between the control electrode and the output electrode of the driving transistor DT) of the driving transistor DT may be generated. The driving current I may be applied to the analog-to-digital converter ADC through the sensing line SL and the integrator 421. The analog-to-digital converter ADC may generate the second sensing data SD2 corresponding to the second driving current value ID2 (i.e., a current value of the driving current I in the second threshold voltage sensing period VSP2). Also, since the first switching transistor ST1 is turned off, the first node N1 may be in the floating state. However, since the anode voltage of the light emitting element EE is fixed to the active voltage VA, an increment of the anode voltage generated by the driving current I may not occur. That is, a decrement of the gate-source voltage (i.e., a voltage between the control electrode and the output electrode of the driving transistor DT) of the driving transistor DT generated by the increment of the anode voltage in the display period DP of FIG. 4 may not occur.

Generating of the first sensing data SD1 and the second sensing data SD2 may be performed in the power-on state. For example, when the driving current I is sensed using the integrator 421, it may take a shorter time than when a voltage of the second node N2 is sensed (i.e., a time to charge an internal capacitor may not be required). Accordingly, the display device 1000 may sense the threshold voltage in the power-on state using the integrator 421.

The driving controller 200 may calculate the threshold voltage value of the driving transistor DT of each of the pixels P based on the first sensing data SD1 and the second sensing data SD2. For example, the threshold voltage value may be calculated by using the following equation 1:

$$VTH = \frac{VGS2 \times \sqrt[2]{ID1} - VGD1 \times \sqrt[2]{ID2}}{\sqrt[2]{ID1} - \sqrt[2]{ID2}},$$

where VTH may be the threshold voltage value, VGS1 may be a gate-source voltage value of the driving transistor in the first period, VGS2 may be a gate-source voltage value of the driving transistor in the second period, ID1 may be the first driving current value, and ID2 may be the second driving current value. The gate-source voltage value VGS1 of the driving transistor DT in the first period P1 and the gate-source voltage value VGS2 of the driving transistor DT in the second period P2 may be obtained from the first reference voltage VREF1, the second reference voltage VREF2, and the active voltage VA directly applied, the first driving current value ID1 and the second driving current value ID2 may be obtained from the first sensing data SD1 and the second sensing data SD2. However, as described above, the decrement of the gate-source voltage (i.e., a voltage between the control electrode and the output electrode of the driving transistor DT) of the driving transistor DT generated by the increment of the anode voltage may be not reflected to the first sensing data SD1 and the second sensing data SD2. Accordingly, when the input image data IMG is compensated based on only the threshold voltage value, an error may occur due to the decrement of the gate-source voltage in the display period DP.

Figure 7:
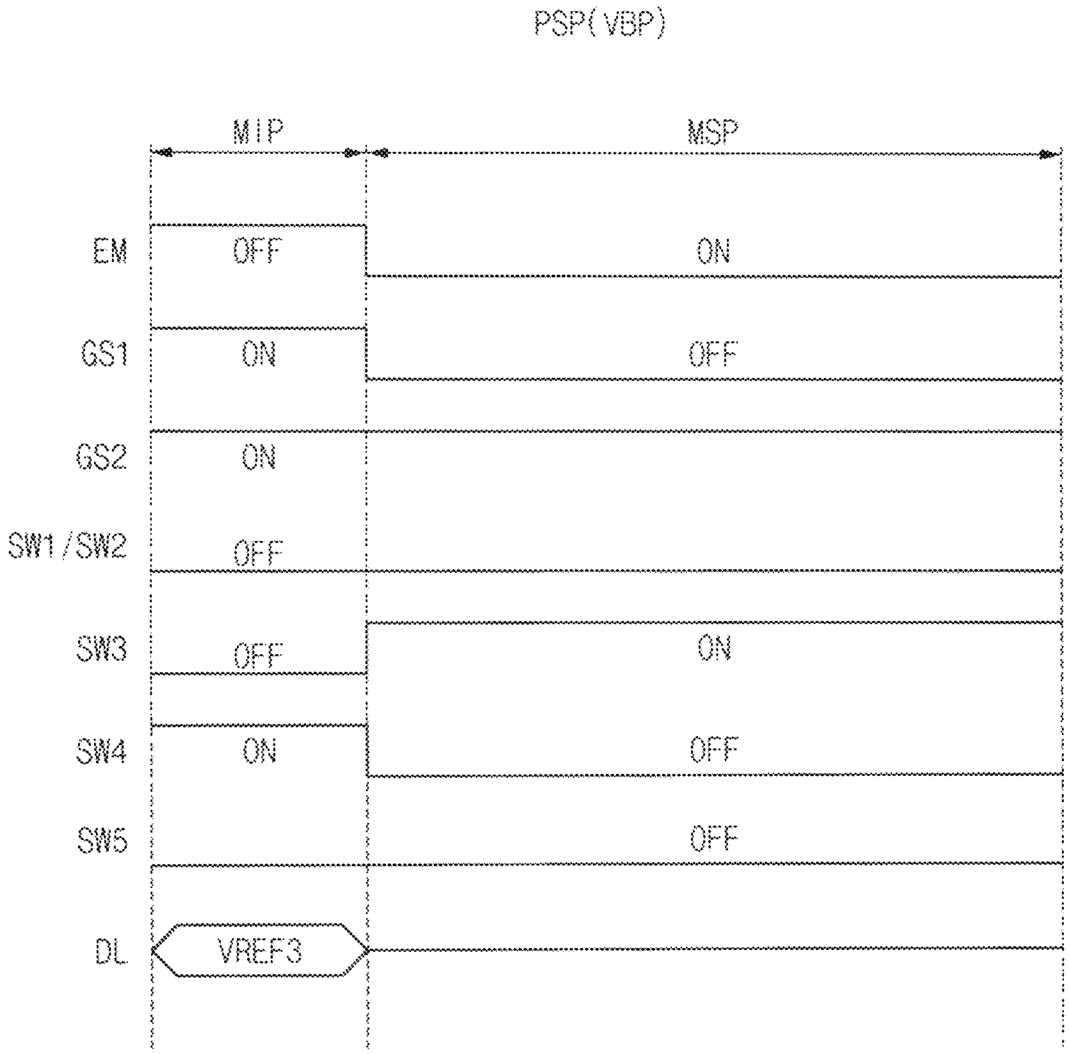
FIG. 7 is a timing diagram illustrating an example in which the display device of FIG. 1 operates in a second sensing period.
Figure 8:
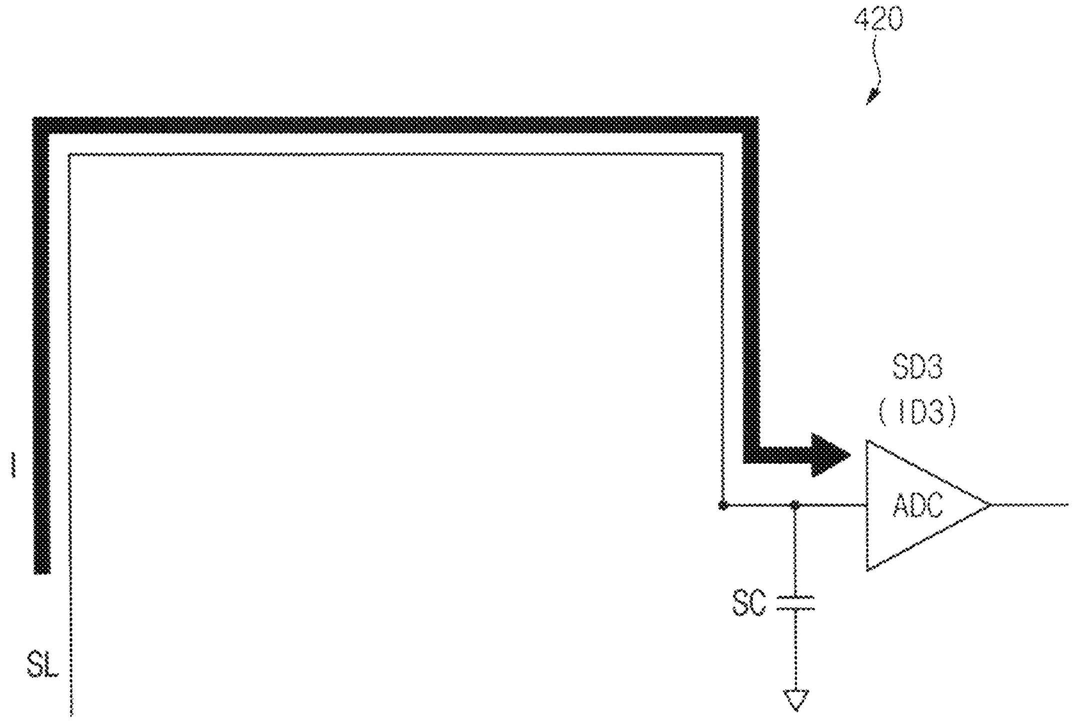
FIG. 8 is a circuit diagram illustrating an example of a flow of a driving current of the display device of FIG. 1 in a second sensing period.

FIG. 7 is a timing diagram illustrating an example in which the display device 1000 of FIG. 1 operates in the second sensing period PSP. FIG. 8 is a circuit diagram illustrating an example of a flow of the driving current I of the display device 1000 of FIG. 1 in the second sensing period PSP. In an embodiment, the first switching transistor ST1 and the second switching transistor ST2 may be an n-type transistor, and the third switching transistor ST3 may be a p-type transistor.

Referring to FIGS. 1 to 3, 7, and 8, The data driver 400 may apply a third reference voltage VREF3 to the pixels P in the second sensing period PSP to generate a third sensing data SD3 corresponding to a third driving current value ID3 of the driving transistor DT of each of the pixels. In an embodiment, the driving controller 200 may compensate the third reference voltage VREF3 based on the first sensing data SD1 and the second sensing data SD2. For example, the driving controller 200 may calculate the threshold voltage value based on the first sensing data SD1 and the second sensing data SD2, and compensate the third reference voltage VREF3 based on the threshold voltage value. For example, similar to the compensation of the input image data IMG, the driving controller 200 may compensate the third reference voltage VREF3 applied to each of the pixels P based on the threshold voltage value of the driving transistor DT of each of the pixels P. For example, the third reference voltage VREF3 may be calculated by using the following equation 2:

$$VREF3 = IVREF3 - VTHT + VTHP.$$

where VREF3 may be the compensated third reference voltage, IVREF3 may be the third reference voltage before compensation, VTHT may be a targeted threshold voltage value, and VTHP may be a sensed threshold voltage value.

The driving controller 200 may receive the third sensing data SD3 from the data driver 400, and calculate a mobility value of the driving transistor DT of each of the pixels P, and compensate the input image data IMG based on the mobility value and the threshold voltage value. For example, the driving controller 200 may calculate an amount of change in the anode voltage of the light emitting element EE based on the third sensing data SD3, and calculate the mobility value of the driving transistor DT based on the amount of the change. That is, the display device 1000 may sense the mobility of the driving transistor DT of each of the pixels P based on the third sensing data SD3. Generating of the third sensing data SD3 may be performed in the power-on state.

The data driver 400 may apply the third reference voltage VREF3 to the pixels P through the data line DL in the second sensing period PSP. As described above, the vertical blank period VBP may include the second sensing period PSP.

The integrator 421 may not operate in the second sensing period PSP. For example, in the second sensing period PSP, the first switch SW1 and the second switch SW2 may be turned off and the third switch SW3 may be turned on. Therefore, in the second sensing period PSP, the driving current I may be provided to the third switch SW3 and may not be provided to the integrator 421.

The second sensing period PSP may include a mobility initialization period MIP, and a mobility sensing period MSP. After the first switching transistor ST1 is turned on in the second sensing period PSP, the third switching transistor ST3 may be turned on. In addition, as the first switching transistor ST1 is turned off in the second sensing period PSP, the third switching transistor ST3 may be turned on. Accordingly, in the second sensing period PSP, the control electrode (i.e., the first node N1) of the driving transistor DT may be in the floating state.

In an embodiment, for example, in the mobility initialization period MIP, the emission signal EM may have an inactivation level, the first gate signal GS1 and the second gate signal GS2 may have an activation level, and the first switch SW1, the second switch SW2, and the third switch SW3 may be turned off, the fourth switch SW4 may be turned on, the fifth switch SW5 may be turned off, and the third reference voltage VREF3 may be applied to the data line DL. For example, in the mobility initialization period MIP, the third reference voltage VREF3 may be applied to the control electrode (i.e., the first node N1) of the driving transistor DT, and the initialization voltage VINT may be applied to the anode electrode (i.e., the second node N2) of the light emitting element EE.

In an embodiment, for example, in the mobility sensing period MSP, the emission signal EM may have an activation level, the first gate signal GS1 may have an inactivation level, the second gate signal GS2 may have an activation level, the first switch SW1 and the second switch SW2 may be turned off, the third switch SW3 may be turned on, the fourth switch SW4 may be turned off, and the fifth switch SW5 may be turned off. For example, in the mobility sensing period MSP, the first power voltage ELVDD may be applied to the input electrode of the driving transistor DT, and the driving current I corresponding to the gate-source voltage (i.e., a voltage between the control electrode and the output electrode of the driving transistor DT) of the driving transistor DT may be generated. The driving current I may be applied to the analog-to-digital converter ADC through the sensing line SL and not the integrator 421. The analog-to-digital converter ADC may generate the third sensing data SD3 corresponding to the third driving current value ID3 (i.e., a current value of the driving current I in the mobility sensing period MSP). Also, since the first switching transistor ST1 is turned off, the first node N1 may be in the floating state. However, due to an influence of the parasitic capacitor CP, a voltage of the first node N1 may not increase by an increase width of the anode voltage of the anode electrode (i.e., the second node N2) of the light emitting element EE. For example, when the anode voltage increases by ΔV with a flow of the driving current in the mobility sensing period MSP, the gate-source voltage (i.e., a voltage between the control electrode and the output electrode of the driving transistor DT) of the driving transistor DT in the mobility sensing period MSP may be decreased by $$\frac{CP}{CST+CP}\times\Delta V,$$

where CP may be a capacitance of the parasitic capacitor and CST may be a capacitance of the storage capacitor, than the gate-source voltage (i.e., a voltage between the control electrode and the output electrode of the driving transistor DT) of the driving transistor DT in the mobility initialization period MIP. That is, like in the display period DP of FIG. 4, the gate-source voltage (i.e., a voltage between the control electrode and the output electrode of the driving transistor DT) of the driving transistor DT may decrease due to the increment of the anode voltage.

The driving controller 200 may calculate the mobility value of the driving transistor DT of each of the pixels P based on the third sensing data SD3. In addition, in the third sensing data SD3, a decrement of the gate-source voltage (i.e., a voltage between the control electrode and the output electrode of the driving transistor DT) of the driving transistor DT generated by the increment of the anode voltage may be reflected. Accordingly, when compensating the input image data IMG based on the mobility value and the threshold voltage value, the compensation may reflect a decrement of the gate-source voltage (i.e., a voltage between the control electrode and the output electrode of the driving transistor DT) of the driving transistor DT generated by the increment of the anode voltage.

The driving controller 200 may compensate the input image data IMG based on the mobility value and the threshold voltage value. For example, the driving controller 200 may compensate the input image data IMG by using the following equation 3:

$$VDATA=\left(\frac{MOBT}{MOBP}\right)^2\times(IVDATA-VINT-VTHT)+VINT+VTHT+(VTHP-VTHT),$$

where VDATA is the compensated data voltage, IVDATA is the data voltage before compensation, VTHT is a targeted threshold voltage value, VTHP is a sensed threshold voltage value of the driving transistor, VINT is the initialization voltage, and MOBT is a targeted mobility value, MOBP is a sensed mobility value of the driving transistor.

Accordingly, the driving controller 200 may compensate differences in the characteristics of the threshold voltage and the mobility of the driving transistor DT of each of the pixels P, which are generated due to process deviation or the like.

Figure 9:
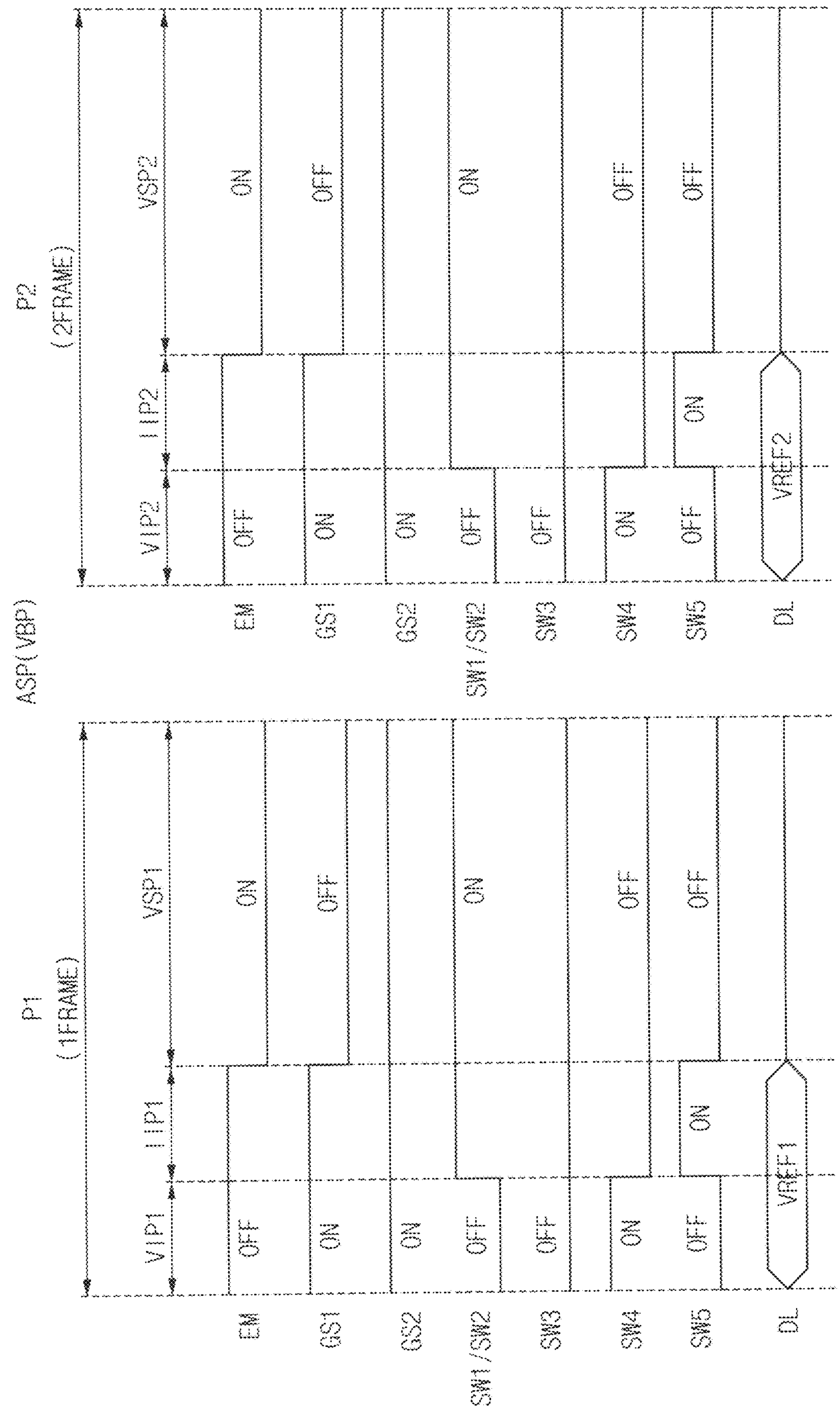
FIG. 9 is a timing diagram illustrating an example in which a display device according to embodiments operates in a first sensing period.

FIG. 9 is a timing diagram illustrating an example in which a display device according to embodiments operates in the first sensing period ASP. In FIG. 9, it is assumed that the first switching transistor ST1 and the second switching transistor ST2 are n-type transistors, and the third switching transistor ST3 is a p-type transistor.

The display device according to the present embodiment is substantially the same as the display device 1000 of FIG. 1 except that operation of the first period P1 and operation of the second period P2 of the first sensing period ASP are performed in different frames. Thus, the same reference numerals are used to refer to the same or similar element, and any repetitive explanation will be omitted.

Referring to FIG. 9, the data driver 400 may apply the first reference voltage VREF1 and the second reference voltage VREF2 to the pixels P through the data line DL in the first sensing period ASP. In an embodiment, the data driver 400 may generate the first sensing data SD1 in a first frame 1Frame, and generate the second sensing data SD2 in a second frame 2Frame different from the first frame 1Frame. That is, the operation of the first period P1 and the operation of the second period P2 of the first sensing period ASP may be performed in different frames. The vertical blank section VBP may include the first sensing period ASP and the second sensing period PSP. In an embodiment, in the vertical blank period VBP, the first sensing period ASP and the second sensing period PSP may be alternately repeated. For example, when the vertical blank period VBP of a current frame is the first period P1 of the first sensing period ASP, the vertical blank period VBP of a next frame may be the second period P2 of the first sensing period ASP. And, when the vertical blank period VBP of a current frame is the second period P2 of the first sensing period ASP, the vertical blank period VBP of a next frame may be the second sensing period PSP. Also, when the vertical blank period VBP of a current frame is the second sensing period PSP, the vertical blank period VBP of a next frame may be the first period P1 of the first sensing period ASP.

Figure 10:
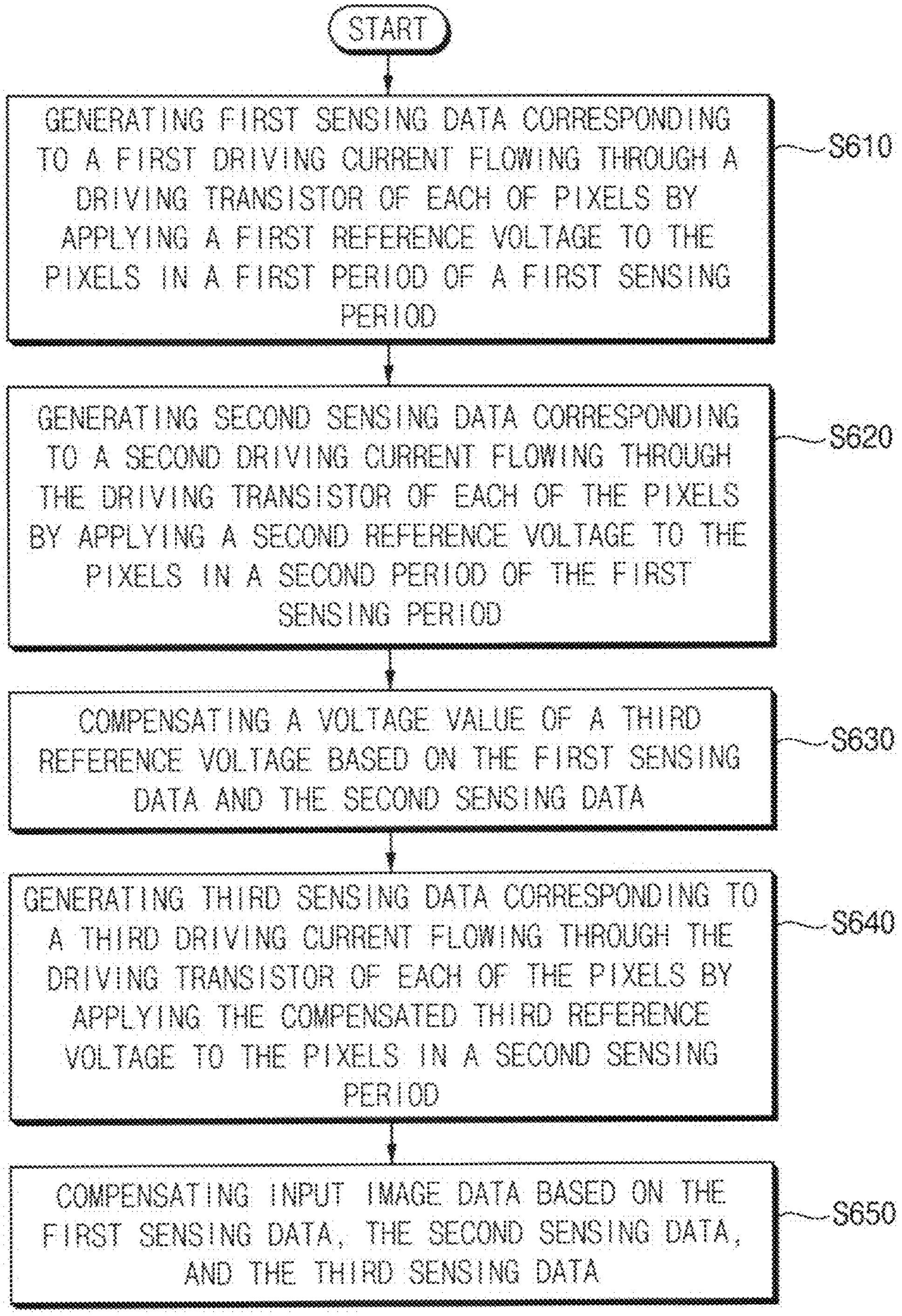
FIGS. 10 and 11 are flowcharts illustrating a method of driving a display device according to embodiments.
Figure 11:
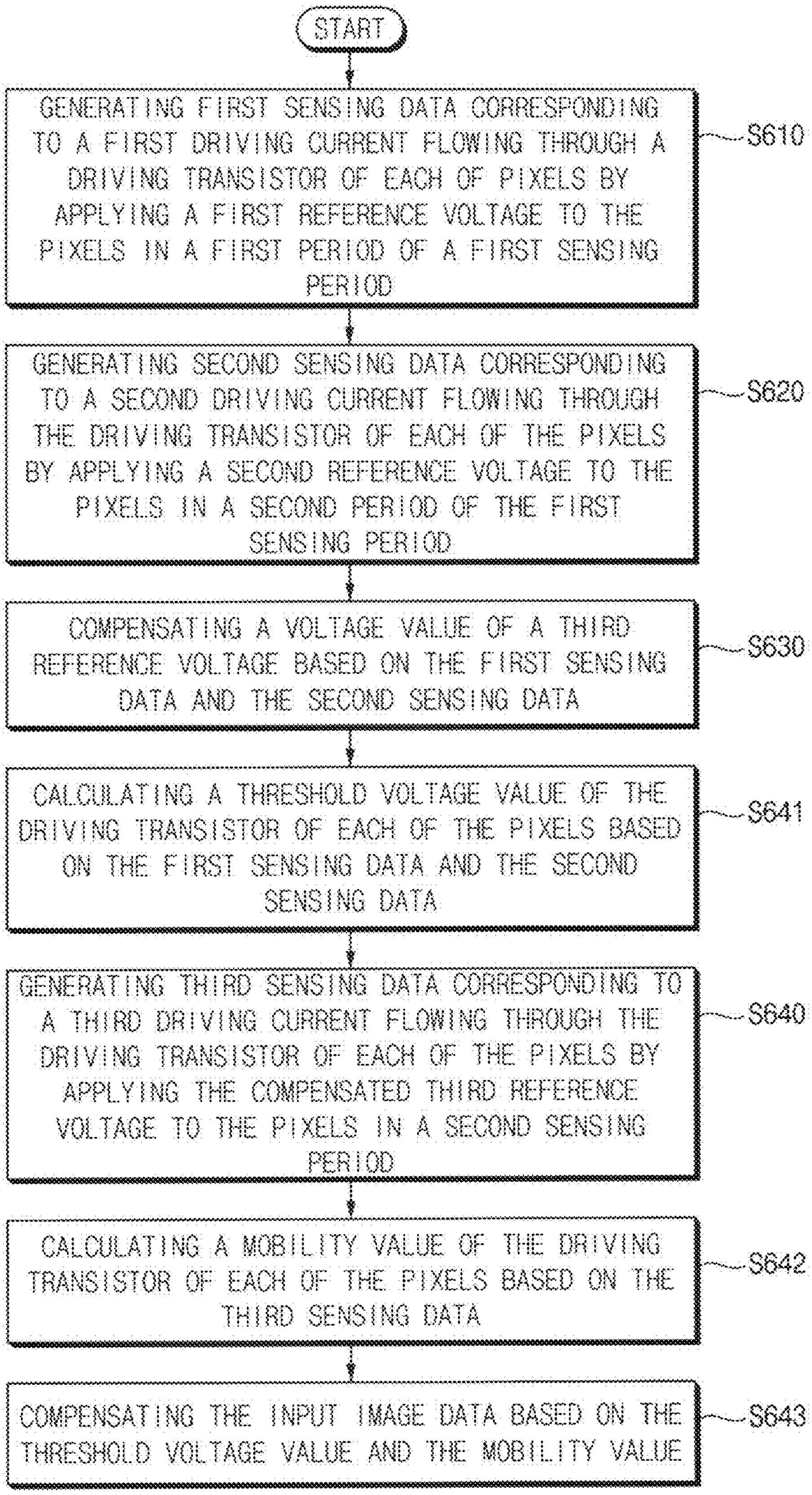

FIGS. 10 and 11 are flowcharts illustrating a method of driving a display device according to embodiments.

Referring to FIGS. 10 and 11, the method may generate first sensing data corresponding to a first driving current flowing through a driving transistor of each of pixels by applying a first reference voltage to the pixels in a first period of a first sensing period (S610), generate second sensing data corresponding to a second driving current flowing through the driving transistor of each of the pixels by applying a second reference voltage to the pixels in a second period of the first sensing period (S620), compensate a third reference voltage based on the first sensing data and the second sensing data (S630), generate third sensing data corresponding to a third driving current flowing through the driving transistor of each of the pixels by applying the compensated third reference voltage to the pixels in a second sensing period (S640), and compensate input image data based on the first sensing data, the second sensing data, and the third sensing data (S650).

Specifically, the method may generate first sensing data corresponding to a first driving current flowing through a driving transistor of each of pixels by applying a first reference voltage to the pixels in the first period of a first sensing period (S610), and generate second sensing data corresponding to a second driving current flowing through the driving transistor of each of the pixels by applying a second reference voltage to the pixels in a second period of the first sensing period (S620). In an embodiment, the first driving current value may be a current flowing through a driving current generated by applying a first reference voltage to the pixels in the first period, and the driving current may be received through an integrator. In an embodiment, a value of the second driving current may be a current value of a driving current generated by applying a second reference voltage to the pixels in the second period, and the driving current may be received through the integrator.

Specifically, the method may compensate a third reference voltage based on the first sensing data and the second sensing data (S630). Similar to the compensation of the input image data, the third reference voltage applied to each of the pixels may be compensated based on the threshold voltage value of the driving transistor of each of the pixels.

In an embodiment, for example, the threshold voltage value may be calculated by using the following equation 4:

$$VTH = \frac{VGS2 \times \sqrt[2]{ID1} - VGD1 \times \sqrt[2]{ID2}}{\sqrt[2]{ID1} - \sqrt[2]{ID2}},$$

where VTH may be the threshold voltage value, VGS1 may be a gate-source voltage value of the driving transistor in the first period, VGS2 may be a gate-source voltage value of the driving transistor in the second period, ID1 may be the first driving current value, and ID2 may be the second driving current value. The gate-source voltage value of the driving transistor in the first period and the gate-source voltage value of the driving transistor in the second period may be obtained from the first reference voltage, the second reference voltage, and the active voltage directly applied, the first driving current value and the second driving current value may be obtained from the first sensing data and the second sensing data.

In an embodiment, for example, the method may calculate the threshold voltage value based on the first sensing data and the second sensing data, and compensate the third reference voltage based on the threshold voltage value. For example, the third reference voltage VREF3 may be compensated by using the following equation 5:

$$VREF3 = IVREF3 - VTHT + VTHP,$$

where VREF3 may be the compensated third reference voltage, IVREF3 may be the third reference voltage before compensation, VTHT may be a targeted threshold voltage value, and VTHP may be a sensed threshold voltage value.

Specifically, the method may generate third sensing data corresponding to a third driving current flowing through the driving transistor of each of the pixels by applying the compensated third reference voltage to the pixels in the second sensing period (S640). In an embodiment, the third driving current value may be a current value of a driving current generated by applying the third reference voltage to the pixels in the second sensing period, and the driving current may be received without going through the integrator.

Specifically, the method may compensate input image data based on the first sensing data, the second sensing data, and the third sensing data (S650). In an embodiment, the method may calculate the threshold voltage value of the driving transistor of each of the pixels based on the first sensing data and the second sensing data (S641), generate third sensing data corresponding to a third driving current flowing through the driving transistor of each of the pixels by applying the compensated third reference voltage to the pixels in the second sensing period (S640), calculate the mobility value of the driving transistor of each of the pixels based on the third sensing data (S642), and compensate the input image data based on the threshold voltage value and the mobility value (S643). For example, the driving controller 200 may compensate the input image data by using the following equation 6:

$$VDATA = \left(\frac{MOBT}{MOBP}\right)^2 \times (IVDATA - VINT - VTHT) + VINT + VTHT + (VTHP - VTHT),$$

where VDATA is the compensated data voltage, IVDATA is the data voltage before compensation, VTHT is a targeted threshold voltage value, VTHP is a sensed threshold voltage value of the driving transistor, VINT is the initialization voltage, and MOBT is a targeted mobility value, MOBP is a sensed mobility value of the driving transistor.

The inventions may be applied to any electronic device including the display device. For example, the inventions may be applied to a television ("TV"), a digital TV, a 3D TV, a mobile phone, a smart phone, a tablet computer, a virtual reality ("VR") device, a wearable electronic device, a personal computer ("PC"), a home appliance, a laptop computer, a personal digital assistant ("PDA"), a portable multimedia player ("PMP"), a digital camera, a music player, a portable game console, a navigation device, etc.

The foregoing is illustrative of the present invention and is not to be construed as limiting thereof. Although a few exemplary embodiments of the present invention have been described, those skilled in the art will readily appreciate that many modifications are possible in the exemplary embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific exemplary embodiments disclosed, and that modifications to the disclosed exemplary embodiments, as well as other exemplary embodiments, are intended to be included within the scope of the appended claims. The present invention is defined by the following claims, with equivalents of the claims to be included therein.

What is claimed is:

1. A display device comprising:

a display panel including pixels;

a data driver configured to apply a data voltage to each of the pixels, to apply a first reference voltage to the pixels in a first period of a first sensing period to generate first sensing data corresponding to a first driving current flowing through a driving transistor of each of the pixels, and to apply a second reference voltage to the pixels in a second period of the first sensing period to generate second sensing data corresponding to a second driving current flowing through the driving transistor of each of the pixels; and a driving controller configured to receive the first sensing data and the second sensing data from the data driver to compensate input image data based on the first sensing data and the second sensing data, wherein the driving controller is configured to calculate a threshold voltage value of the driving transistor of each of the pixels based on the first sensing data and the second sensing data, wherein the data driver is configured to apply a third reference voltage to the pixels in a second sensing period to generate third sensing data corresponding to a third driving current flowing through the driving transistor of each of the pixels, and wherein the driving controller is configured to receive the third sensing data from the data driver, to calculate a mobility value of the driving transistor of each of the pixels, and to compensate the input image data based on the mobility value and the threshold voltage value.

2. The display device of claim 1, wherein the threshold voltage value is calculated by using an equation $$VTH = \frac{VGS2 \times \sqrt[2]{ID1} - VGS1 \times \sqrt[2]{ID2}}{\sqrt[2]{ID1} - \sqrt[2]{ID2}},$$

where VTH is the threshold voltage value, VGS1 is a gate-source voltage value of the driving transistor in the first period, VGS2 is a gate-source voltage value of the driving transistor in the second period, ID1 is a value of the first driving current, and ID2 is a value of the second driving current.

3. The display device of claim 1, wherein the data driver is configured to generate the first sensing data and the second sensing data in one frame.

4. The display device of claim 1, wherein the data driver is configured to generate the first sensing data in a first frame and to generate the second sensing data in a second frame different from the first frame.

5. The display device of claim 1, wherein generating of the first sensing data, the second sensing data, and the third sensing data is performed in a power-on state.

6. The display device of claim 1, wherein the driving controller is configured to compensate the third reference voltage based on the first sensing data and the second sensing data.

7. The display device of claim 1, wherein the data driver includes:

an output buffer circuit configured to apply the data voltage to each of the pixels; and a sensing circuit configured to generate the first sensing data, the second sensing data, and the third sensing data.

8. The display device of claim 7, wherein the sensing circuit includes:

an integrator connected to the pixels through a sensing line and configured to receive a driving current flowing through the driving transistor of each of the pixels through the sensing line, wherein the driving current includes the first driving current, the second driving current, and the third driving current.

9. The display device of claim 8, wherein the integrator is configured to fix an anode voltage of a light emitting element of each of the pixels to an active voltage in the first sensing period.

10. The display device of claim 8, wherein the integrator operates in the first sensing period and does not operate in the second sensing period.

11. The display device of claim 8, wherein the sensing circuit further includes:

an analog-to-digital converter configured to generate the first sensing data, the second sensing data, and the third sensing data;

a first switch configured to selectively connect the sensing line and the integrator;

a second switch configured to selectively connect the integrator and the analog-to-digital converter; and a third switch configured to selectively connect the sensing line and the analog-to-digital converter.

12. The display device of claim 11, wherein, in the first sensing period, the first switch and the second switch are turned on and the third switch is turned off, and wherein, in the second sensing period, the first switch and the second switch are turned off, and the third switch is turned on.

13. The method display device of claim 11, wherein the sensing circuit further includes:

a fourth switch configured to selectively apply an initialization voltage to the sensing line.

14. The display device of claim 11, wherein the sensing circuit further includes:

a fifth switch configured to selectively connect an input terminal of the integrator and an output terminal of the integrator.

15. The display device of claim 1, wherein each of the pixels includes:

a light emitting element;

a first switching transistor configured to apply the data voltage to a control electrode of the driving transistor in response to a first gate signal;

a storage capacitor configured to store the data voltage;

the driving transistor configured to apply a driving current to the light emitting element based on the data voltage;

a second switching transistor configured to provide the driving current to a sensing line in response to a second gate signal; and a third switching transistor configured to apply a first power voltage to the driving transistor in response to an emission signal, wherein the driving current includes the first driving current, the second driving current, and the third driving current.

16. The display device of claim 15, wherein, in the first period, the second period, and the second sensing period, the third switching transistor is turned on after the first switching transistor is turned on.

17. A method of driving a display device comprising:

generating first sensing data corresponding to a first driving current flowing through a driving transistor of each of pixels by applying a first reference voltage to the pixels in a first period of a first sensing period;

generating second sensing data corresponding to a second driving current flowing through the driving transistor of each of the pixels by applying a second reference voltage to the pixels in a second period of the first sensing period;

compensating a voltage value of a third reference voltage based on the first sensing data and the second sensing data;

generating third sensing data corresponding to a third driving current flowing through the driving transistor of each of the pixels by applying the compensated third reference voltage to the pixels in a second sensing period; and compensating input image data based on the first sensing data, the second sensing data, and the third sensing data.

18. The method of claim 17, further comprising:

calculating a threshold voltage value of the driving transistor of each of the pixels based on the first sensing data and the second sensing data; and calculating a mobility value of the driving transistor of each of the pixels based on the third sensing data, and wherein the compensating of the input image data is performed based on the threshold voltage value and the mobility value.

* * * * *